US012732365B1

(12) United States Patent
Adikari et al.

(10) Patent No.: US 12,732,365 B1
(45) Date of Patent: Sep. 8, 2026

(54) ADDING SCALAR BLINDING IN ELLIPTIC CURVE CRYPTOGRAPHY

(71) Applicant: Synopsys, Inc., Sunnyvale, CA (US)

(72) Inventors: A. A. Jithra Adikari, Ottawa (CA); Rudolphus J. C. Derwig, Eindhoven (NL)

(73) Assignee: Synopsys, Inc., Sunnyvale, CA (US)

( * ) Notice: Subject to any disclaimer, the term of this patent is extended or adjusted under 35 U.S.C. 154(b) by 15 days.

(21) Appl. No.: 18/805,454

(22) Filed: Aug. 14, 2024

(51) Int. Cl.
*H04L 9/30* (2006.01)
*G06F 7/72* (2006.01)

(52) U.S. Cl.
CPC ............ *H04L 9/3066* (2013.01); *G06F 7/725* (2013.01)

(58) Field of Classification Search
CPC ............................... H04L 9/3066; G06F 7/725
See application file for complete search history.

(56) References Cited

U.S. PATENT DOCUMENTS 7,903,811 B2 * 3/2011 Vasyltsov ............... G06F 7/725 380/28
7,961,874 B2 * 6/2011 Ibrahim .................. G06F 7/725 380/28
9,584,320 B1 * 2/2017 Parkinson ............. H04L 9/3066
2008/0260143 A1 * 10/2008 Ibrahim .................. H04L 9/003 380/28
2009/0214023 A1 * 8/2009 Al-Somani ............. H04L 9/003 380/28
2010/0195821 A1 * 8/2010 Fischer ..................... G06F 7/57 380/28

OTHER PUBLICATIONS

Ciet M, et al., "(Virtually) Free Randomization techniques for Elliptic Curve Cryptography," In: Qing, S., Gollmann, D., Zhou, J. (eds) Information and Communications Security. ICICS 2003. Lecture Notes in Computer Science, vol. 2836. Springer, Berlin, Heidelberg. pp. 1-12. https://doi.org/10.1007/978-3-540-39927-8_32.

* cited by examiner

*Primary Examiner* — SM A Rahman
(74) *Attorney, Agent, or Firm* — Weaver Austin Villeneuve & Sampson LLP

(57) ABSTRACT

A method of performing elliptic curve cryptography includes, in part, receiving a scalar k representative of a secret key; and splitting, by a processing device, a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n); i.e., r<k(/2*n).

20 Claims, 3 Drawing Sheets

ADDING SCALAR BLINDING IN ELLIPTIC CURVE CRYPTOGRAPHY

TECHNICAL FIELD

The present application relates to cryptography, and more particularly to applying scalar blinding in elliptic curve cryptography.

BACKGROUND

Cryptography involves performing multiple computations using private and public keys to encrypt and decrypt data. As cryptography algorithms become more advanced and secure, attempts to attack and circumvent such cryptographic algorithms have also become more sophisticated. Side-channel analysis is one form of attack that traces, for example, the power emission used in performing the scalar multiplications to gain information about the scalar value used in the multiplications. To prevent potential access to the scalar value during an attack, the scalar may be blinded prior to being used as a parameter in encrypting the data.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to splitting the scalar value representative of a private key used in encrypting data in order to prevent side-channel attacks.

Elliptic curve cryptography (ECC) uses an elliptic curve over a finite domain to encrypt and decrypt data. ECC allows the use of smaller private keys than Rivest-Shamir-Adleman (RSA) algorithm for an equivalent level of security.

Figures 1, 2:
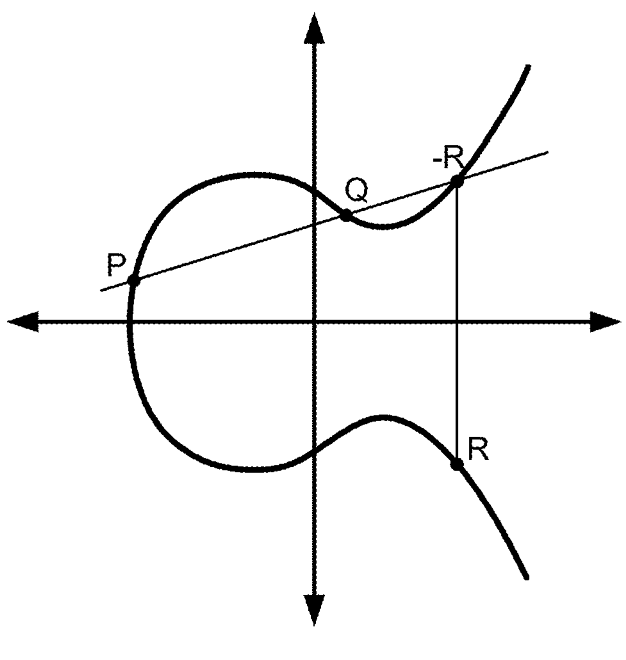
FIG. 1 shows a multitude of points on a elliptic curve used during cryptography, in accordance with one embodiment of the present disclosure.
FIG. 2 shows a pair of tangential lines to the elliptic curve of FIG. 1, in accordance with one embodiment of the present disclosure.

FIG. 1 shows an example of an elliptic curve 100 in the Cartesian coordinate system. Elliptic curves, such as elliptic curve 100, are often described using the following algebraic expression:

$$y^2x^3+ax+b \quad (1)$$

In expression (1), parameters a and b are integers. As shown in FIG. 1, the intersection (i.e., point −R) of a line drawn between points P and Q on the elliptic curve when reflected along the x-axis results in point R that is the sum of points P and Q. In other words, P+Q=R. The ECC computations are often performed using modulo operations of a prime number.

To add a point to itself, e.g., to compute P+P, the intersection of the curve and a line that is tangent to point P is first determined. The point of intersection is −2P. The reflection of the intersection point along the x-axis is 2P, as shown in FIG. 2. If the line between two points, such as points R and S, is parallel to the Y-axis (i.e., the two points have the same x coordinate), then the sum of the points R and S becomes infinite. Similarly, adding a point T, defined by the intersection of the curve with the x-axis, to itself also becomes infinite as the line tangent to T is also parallel to the y-axis. Scalar multiplication of a point on the curve by an integer k is the same as adding the point to itself k times. Determining the sum of a pair of numbers on an elliptic curve algebraically is well understood and is not described herein.

Scalar multiplication along an elliptical curve is nearly a one-way function. In other words, given a point Q on an elliptical curve—where Q is k modulo Z of P, and where k is an integer and Z is a prime number—finding k such that Q=kP modulo Z is a very difficult problem and therefore not easily detectable, according to the elliptic curve discrete logarithm problem. This is the fundamental principle behind the elliptic curve Diffie-Hellman key exchange protocol.

To perform elliptic encryption, a generator point G on the elliptic curve is often defined in advance. The generator point G is selected such that G generates a cyclic subgroup. Accordingly, every point on the subgroup may be reached by a repeated addition of the generator point to itself. The order of G, herein referred to as n, is the number of points in the subgroup that G can generate. The order of G is also the smallest integer k such that kG modulo Z points to the infinity, as described above The domain parameters of an ECC thus include, in part, parameter Z specifying the finite field over which the elliptic curve will be defined over and is thus used in the modulo operations, elliptic curve parameters a and b (defined above) which together with parameter Z define the elliptic curve, the generator point G, and the order of G.

Assume parties A and B desire to communicate with one another via a public network and using elliptic curve cryptography that involves a key exchange protocol. To achieve this, parties A and B agree on a specific elliptic curve defined by parameters a and b, prime modulus Z, generator point G, and the order n of G. Party A selects a private key α that is an integer less than or equal to n. Party A does not share his/her private key α with others. Party A then computes a point U on the elliptic curve defined by a scalar multiplication of generator point G and a as shown below:

$$U=\alpha G \text{ modulo } Z$$

Party A then transmits U to party B. In a similar manner, party B selects a private key β that is an integer less than or equal to n. Party B does not share his/her private key β with others. Party B then computes a point V on the elliptic curve defined by a scalar multiplication of generator point G and β as shown below:

$$V=\beta G \text{ modulo } Z$$

Party B then transmits V to party A. Points U and V can be detected during transmission by a malicious actor trying to decipher the message being transmitted. However, the malicious actor cannot readily determine the number of times G has been multiplied to arrive at point U. Similarly, the malicious actor cannot determine the number of times G has been multiplied to arrive at point V, according to the elliptic curve discrete logarithm problem.

After receiving point U from party A, party B multiplies U by β to compute the point W on the elliptic curve defined by (αβG modulo Z). Similarly, after receiving point V from party B, party A multiplies V by α to compute the same point W on the elliptic curve defined by (αβG modulo Z). Therefore, both parties A and B compute the same point on the elliptic curve resulting in the decryption of the encrypted message.

The security in elliptic curve cryptography may be compromised using any one of a number of side-channel attacks. Some examples of side-channel attacks are cache-attacks, timing attacks, power-monitoring attacks, and electromagnetic attacks. In a cache-attack, the attacker attempts to monitor cache accesses made by a potential target in a shared physical system, such as in a virtualized environment or in a cloud service. Timing attacks involve measuring the length of time various computations take to perform. Power monitoring attacks make use of the varying power consumption by the hardware during computations. Electro-magnetic attacks are based on leaked electromagnetic radiation measurements to identify secret keys. A number of other side-channel attacks also exist.

In accordance with one aspect of the present disclosure, to enhance security and thwart side-channel attacks, a scalar blinding technique is applied to the secret key by randomly splitting the secret key. As was described above, the scalar (hereinafter identified as k) which is the secret key of the party holding the key, is used to multiply the generator point (hereinafter identified as point P) on the elliptic curve to arrive at another point Q on the curve, where k, P and Q are defined using the following relationship:

$$Q=[k]P \quad (1)$$

In accordance with embodiments of the present disclosure, the scalar k is split using a random integer r such that:

$$[k]P=[k-r]P+[r]P \quad (2)$$

As described further below, among technical advantages of the present disclosure are substantially enhanced computation speed, and hance significant savings in computational cost. In order to increase the computation speed, in one embodiment, double scalar multiplications are used. However, applying the double scalar multiplications requires two different generator points on the elliptic curve. Accordingly, in one embodiment, expression (2) is modified such that the second generator point is obtained by adding the first generator point to itself. In other words, expression (2) is modified such that the second generator point is P+P=2 P. Accordingly, expression (2) may be rewritten as:

$$[k]P=[k-r]P+[r/2]2P, \text{ where } r<k/4 \quad (3)$$

Because expression (3) includes two generator points P and 2P, double scalar multiplications may be used to speed up the computations. For example, for an 1-bit elliptic curve, computing the expression [k−r]P+[r]P requires 2*(1−1) point doublings and (1+1) point additions on average. Calculating [k]P=[k−r]P+[r/2]2P, however, with double scalar multiplication, requires 1 point doubling and (0.75*1+1) point additions, which provides nearly 35% savings in execution time.

Following is an example of how double scalar multiplication is used to speed up the computations. Assume that the secret key (i.e., scalar k) is 105, and that the random variable r is selected to be 26. Therefore [k−r]=79, r/2=13, and [105]P=[79]P+[13]Q, where Q=[2]P. Using binary numbers to represent 79 and 13 it is seen that:

$$[79]P+[13]Q=[100\_1111]P+[000\_1101]Q \quad (4)$$

In accordance with one aspect of the present disclosure, R=P+Q=[3]P is precomputed. The $6^{th}$ bits of pair of numbers 79 and 13 are respectively (1, 0), therefore [1]P+[0]Q is determined and loaded into intermediate variable S, i.e., S=P. Variable S is subsequently doubled. Next, the $5^{th}$ bits of pair of numbers 79 and 13, namely (0,0) are used to determine [0]P+[0]Q, the result of which is added to the doubled value of S as shown below:

$$S=[2]P+[0]P+[0]Q=[2]P \quad (5)$$

Variable S is then doubled. Next, the $4^{th}$ bits of pair of numbers 79 and 13, namely (0,0) are used to determine [0]P+[0]Q, which is then added to the doubled value of S resulting in an updated S having the value shown below:

$$S=[4]P+[0]Q+[0]Q=[4]P \quad (6)$$

Variable S is then doubled. Next, the $3^{rd}$ bits of pair of numbers 79 and 13, namely (1,1) are used to determine [1]P+[1]Q=R. The precomputed R is then added to the doubled value of S resulting in an updated S having the value shown below:

$$S=[8]P+[1]P+[1]Q=[9]P+[1]Q=[11]P \quad (7)$$

Variable S is then doubled. Next, the $2^{nd}$ bits of pair of numbers 79 and 13, namely (1,1) are used to determine [1]P+[1]Q=R. The precomputed R is then added to the doubled value of S resulting in an updated S having the value shown below:

$$S=[18]P+[2]Q+[1]P+[1]Q=[19]P+[3]Q=[25]P \quad (8)$$

Variable S is then doubled. Next, the $1^{st}$ bits of pair of numbers 79 and 13, namely (1,0) are used to determine [1]P+[0]Q which is then added to the doubled value of S resulting in an updated S having the value shown below:

$$S=[38]P+[6]Q+[1]P+[0]Q=[39]P+[6]Q=[51]P \quad (9)$$

Variable S is then doubled. Next, the $0^{th}$ bits of pair of numbers 79 and 13, namely (1,1) are used to determine [1]P+[1]Q=R which is then added to the doubled value of S resulting in an updated S having the value shown below:

$$S=[78]P+[12]Q+[1]P+[1]Q=[79]P+[13]Q=[105]P \quad (10)$$

The result shown in expression (10) is the result of multiplying scalar 105 by point P using split values of 79 and 26.

In some embodiment, the second generator point on the elliptic curve may be set to nP, where n is a power of 2 (e.g., 2, 4, 8 . . . ). In such embodiment, r may be defined as:

$$r<k/(2*n) \quad (11)$$

Accordingly, in such embodiments, [k]P is determined as show below:

$$[k]P=[k-r]P+[r/n]nP \quad (12)$$

Figure 3:
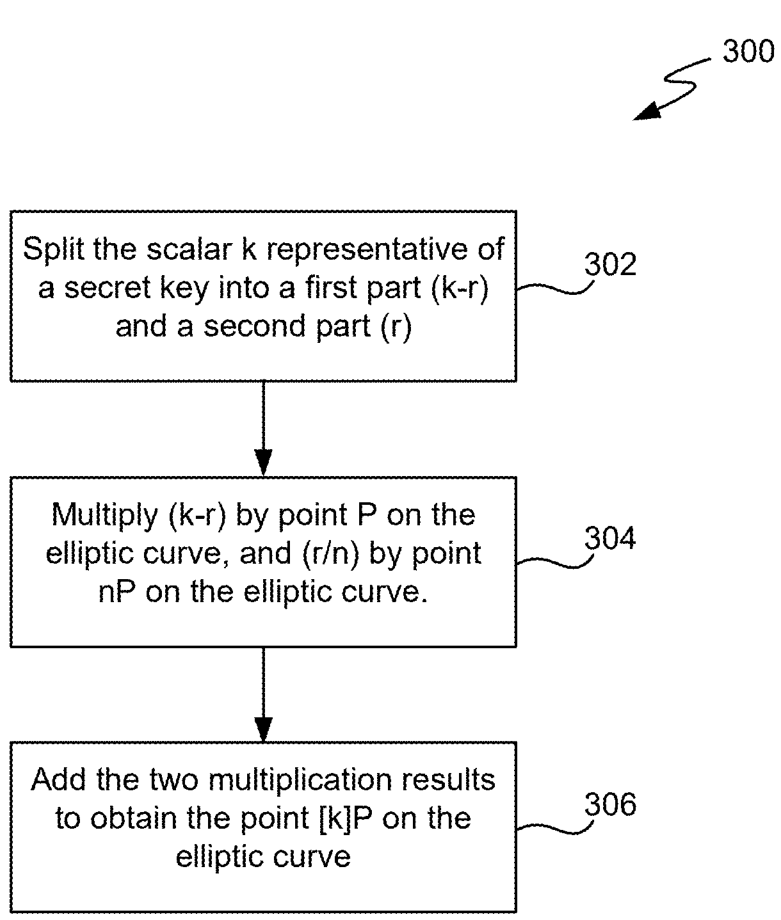
FIG. 3 is a flowchart of steps performed to prevent side-channel attacks during elliptic curve cryptography, in accordance with one embodiment of the present disclosure.

FIG. 3 is a flowchart 300 of steps performed to thwart side-channel attacks during elliptic curve cryptography, in accordance with one embodiment of the present disclosure. At 302, the scalar k (which represents the private key) is split into two parts, namely [k−r] and [r], where r is a random integer number smaller than k/(2*n) and n is a power of 2 of an integer number, (e.g., 2, 4, 8 . . . ).

At 304, [k−r] is multiplied by the first generator point P on the elliptic curve to obtain [k−r]P, and [r/n] is multiplied by the second generator point nP on the elliptic curve to obtain [r/n](nP). At 306, the products [k−r]P and [r/n](nP) are added together to determine the result [k]P. In some embodiments, n is equal to 2 such that the two generator points on the elliptic curve are P and 2P. In the embodiments when n is equal to 2, double scalar multiplication is used to compute the sum [k−r]P+[r/2](2P) as described in detail in the example above.

A method of performing elliptic curve cryptography, in accordance with one embodiment of the present disclosure, includes, in part, receiving a scalar k representative of a secret key; and splitting, by a processing device, a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n), i.e., r<k/(2*n). In one embodiment, n is equal to 2.

In one embodiment, the method further includes, in part, precomputing R=[1]P+[2]P=[3]P; and storing the R in a memory. In one embodiment, the method further includes, in part, multiplying a most significant bit of [k−r] by P to generate a first value; multiplying a most significant bit of r/2 by 2P to generate a second value; and adding the first and second values to generate a third value.

In one embodiment, the method further includes, in part, doubling the third value to generate a fourth value; multiplying a second most significant bit of [k−r] by P to generate a fifth value; multiplying a second most significant bit of r/2 by 2P to generate a sixth value; and adding the fourth, fifth and sixth values to generate a seventh value. In one embodiment, the method further includes, in part, doubling the seventh value to generate an eight value; multiplying a third most significant bit of [k−r] by P to generate a ninth value; multiplying a third most significant bit of r/2 by 2P to generate a tenth value; and adding the eighth, ninth and tenth values to generate an eleventh value, wherein the eleventh value is used to determine an encrypted point on the elliptic curve in accordance with the secret key and the generator point P. In one embodiment, r is randomly selected.

A system, in accordance with one embodiment of the present disclosure, includes, in part, hardware state machine configured to: receive a scalar k representative of a secret key; and split and a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n).

In one embodiment of the system, n is equal to 2. In one embodiment of the system, the hardware state machine is further configured to: precompute R=[1]P+[2]P=[3]P; and store the R in a memory. In one embodiment of the system, the hardware state machine is further configured to multiply a most significant bit of [k−r] by P to generate a first value; multiply a most significant bit of r/2 by 2P to generate a second value; and add the first and second values to generate a third value.

In one embodiment of the system, the hardware state machine is further configured to double the third value to generate a fourth value; multiply a second most significant bit of [k−r] by P to generate a fifth value; multiply a second most significant bit of r/2 by 2P to generate a sixth value; and add the fourth, fifth and sixth values to generate a seventh value. In one embodiment of the system, the hardware state machine is further configured to double the seventh value to generate an eight value; multiply a third most significant bit of [k−r] by P to generate a ninth value; multiply a third most significant bit of r/2 by 2P to generate a tenth value; and add the eighth, ninth and tenth values to generate an eleventh value, wherein the eleventh value is used to determine an encrypted point on the elliptic curve in accordance with the secret key and the generator point. In one embodiment of the system, r is randomly selected.

A system, in accordance with one embodiment of the present disclosure, includes, in part, a memory storing instructions; and a processor, coupled with the memory and configured to execute the instructions. The instructions when executed cause the processor to: receive a scalar k representative of a secret key; and split and a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n).

In one embodiment of the system, n is equal to 2. In one embodiment of the system, the instructions further cause the processor to: precompute R=[1]P+[2]P=[3]P; and store the R in a memory. In one embodiment of the system, the instructions further cause the processor to multiply a most significant bit of [k−r] by P to generate a first value; multiply a most significant bit of r/2 by 2P to generate a second value; and add the first and second values to generate a third value.

In one embodiment of the system, the instructions further cause the processor to double the third value to generate a fourth value; multiply a second most significant bit of [k−r] by P to generate a fifth value; multiply a second most significant bit of r/2 by 2P to generate a sixth value; and add the fourth, fifth and sixth values to generate a seventh value. In one embodiment of the system, the instructions further cause the processor to double the seventh value to generate an eight value; multiply a third most significant bit of [k−r] by P to generate a ninth value; multiply a third most significant bit of r/2 by 2P to generate a tenth value; and add the eighth, ninth and tenth values to generate an eleventh value, wherein the eleventh value is used to determine an encrypted point on the elliptic curve in accordance with the secret key and the generator point. In one embodiment of the system, r is randomly selected.

Figure 4:
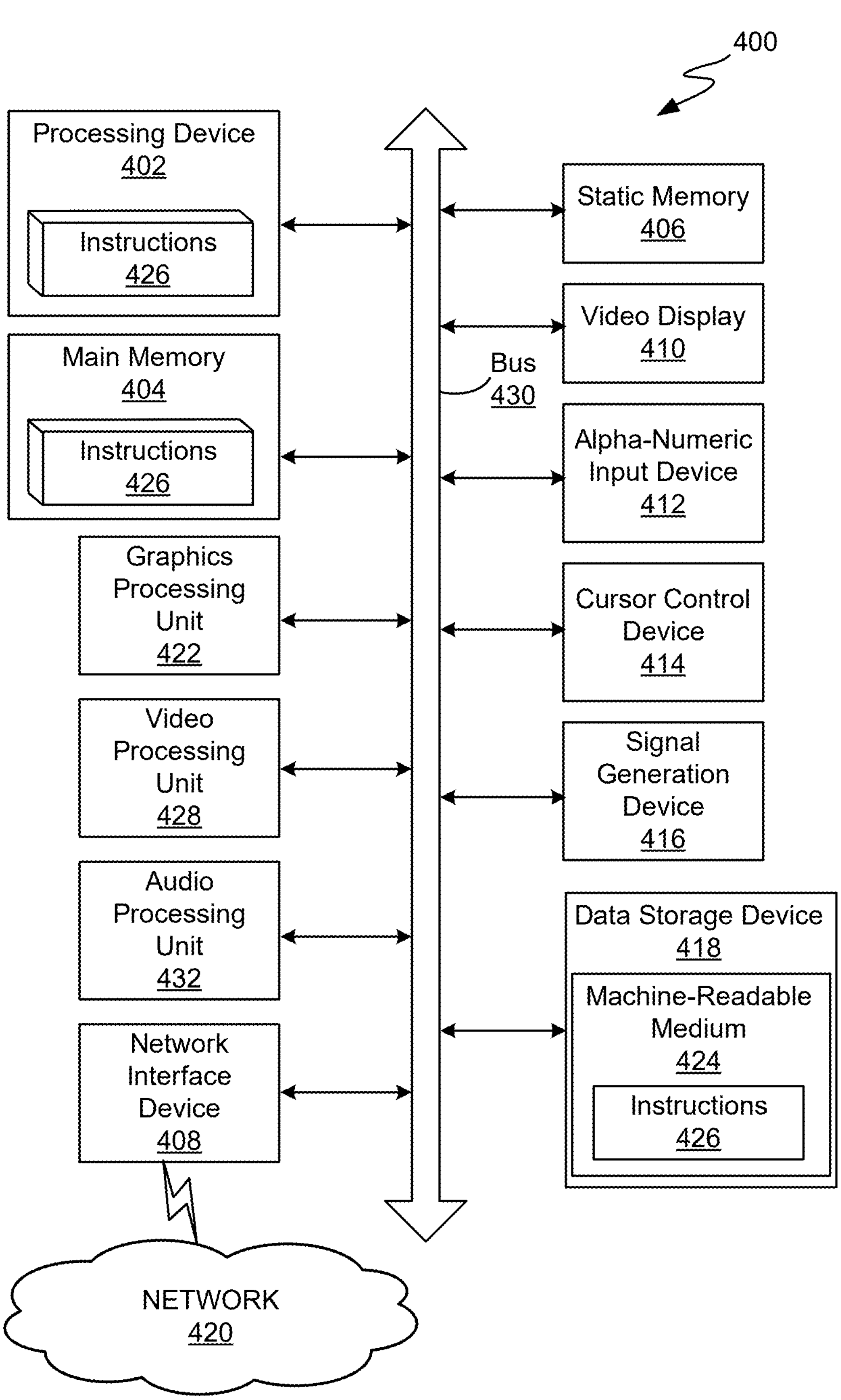
FIG. 4 depicts a number of blocks of an example of a computer system in which embodiments of the present disclosure may operate.

FIG. 4 illustrates an example of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, hardware state machine, control logic, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer-readable medium) on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

What is claimed:

1. A method of performing elliptic curve cryptography comprising:

receiving a scalar k representative of a secret key; and splitting, by a processing device, a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n), so as to enhance computation speed associated with performing the elliptic curve cryptography.

2. The method of claim 1, wherein n is equal to 2.

3. The method of claim 2, further comprising:

precomputing R=[1]P+[2]P=[3]P; and storing the R in a memory.

4. The method of claim 3, further comprising:

multiplying a most significant bit of [k−r] by P to generate a first value;

multiplying a most significant bit of r/2 by 2P to generate a second value; and adding the first and second values to generate a third value.

5. The method of claim 4, further comprising:

doubling the third value to generate a fourth value;

multiplying a second most significant bit of [k−r] by P to generate a fifth value;

multiplying a second most significant bit of r/2 by 2P to generate a sixth value; and adding the fourth, fifth and sixth values to generate a seventh value.

6. The method of claim 5 further comprising:

doubling the seventh value to generate an eight value;

multiplying a third most significant bit of [k−r] by P to generate a ninth value;

multiplying a third most significant bit of r/2 by 2P to generate a tenth value; and adding the eighth, ninth and tenth values to generate an eleventh value, wherein the eleventh value is used to determine an encrypted point on the elliptic curve in accordance with the secret key and the generator point P.

7. The method of claim 6 wherein r is randomly selected.

8. A system comprising hardware state machine configured to:

receive a scalar k representative of a secret key; and split and a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n), so as to enhance computation speed associated with performing an elliptic curve cryptography.

9. The system of claim 8 wherein n is equal to 2.

10. The system of claim 9, wherein the hardware state machine is further configured to:

precompute R=[1]P+[2]P=[3]P; and store the R in a memory.

11. The system of claim 10, wherein the hardware state machine is further configured to:

multiply a most significant bit of [k−r] by P to generate a first value;

multiply a most significant bit of r/2 by 2P to generate a second value; and add the first and second values to generate a third value.

12. The system of claim 11, wherein the hardware state machine is further configured to:

double the third value to generate a fourth value;

multiply a second most significant bit of [k−r] by P to generate a fifth value;

multiply a second most significant bit of r/2 by 2P to generate a sixth value; and add the fourth, fifth and sixth values to generate a seventh value.

13. The system of claim 12, wherein the hardware state machine is further configured to:

double the seventh value to generate an eight value;

multiply a third most significant bit of [k−r] by P to generate a ninth value;

multiply a third most significant bit of r/2 by 2P to generate a tenth value; and add the eighth, ninth and tenth values to generate an eleventh value, wherein the eleventh value is used to determine an encrypted point on the elliptic curve in accordance with the secret key and the generator point.

14. The system of claim 13 wherein r is randomly selected.

15. A system comprising:

a memory storing instructions; and a processor, coupled with the memory and configured to execute the instructions, the instructions when executed causing the processor to:

receive a scalar k representative of a secret key; and split and a multiplication of k by a generator point P on the elliptic curve ([k]P) into a sum of a first multiplication defined by [k−r]P, and a second multiplication defined by [r/n](nP), where n is a power of 2 of an integer number, and r is an integer smaller than k/(2*n), so as to enhance computation speed associated with performing an elliptic curve cryptography.

16. The system of claim 15 wherein n is equal to 2.

17. The system of claim 16, wherein the instructions further cause the processor to:

precompute R=[1]P+[2]P=[3]P; and store the R in a memory.

18. The system of claim 17, wherein the instructions further cause the processor to:

multiply a most significant bit of [k−r] by P to generate a first value;

multiply a most significant bit of r/2 by 2P to generate a second value; and add the first and second values to generate a third value.

19. The system of claim 18, wherein the instructions further cause the processor to:

double the third value to generate a fourth value;

multiply a second most significant bit of [k−r] by P to generate a fifth value;

multiply a second most significant bit of r/2 by 2P to generate a sixth value; and add the fourth, fifth and sixth values to generate a seventh value.

20. The system of claim 19, wherein the instructions further cause the processor to:

double the seventh value to generate an eight value;

multiply a third most significant bit of [k−r] by P to generate a ninth value;

multiply a third most significant bit of r/2 by 2P to generate a tenth value; and add the eighth, ninth and tenth values to generate an eleventh value, wherein the eleventh value is used to determine an encrypted point on the elliptic curve in accordance with the secret key and the generator point.

* * * * *